June 20, 1961 W. F. KING 2,988,918
BALANCING MACHINE
Filed July 25, 1955 5 Sheets-Sheet 2
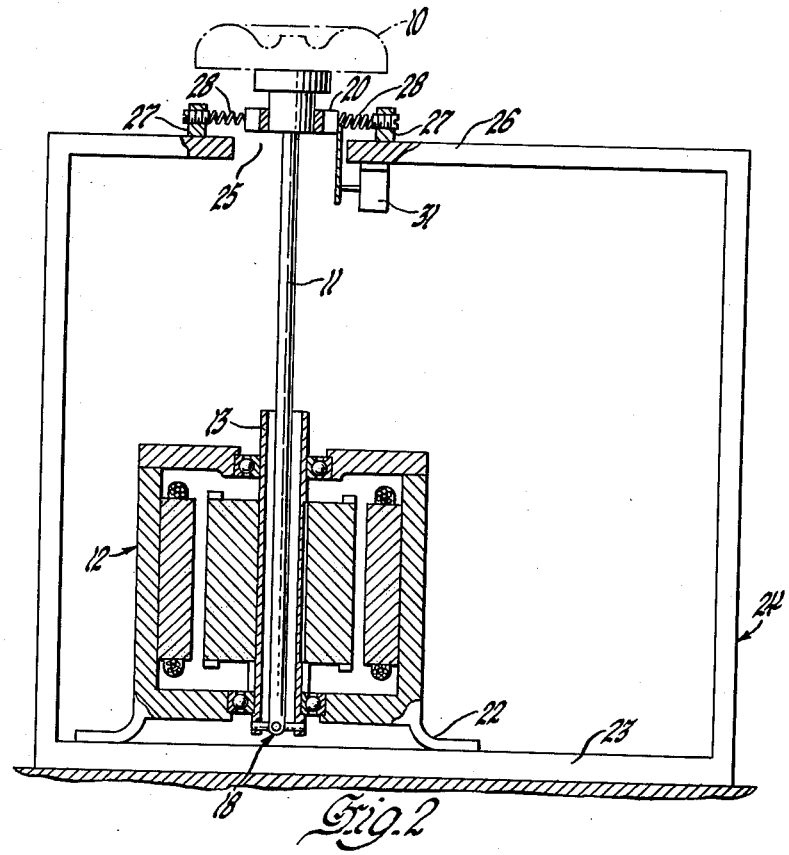
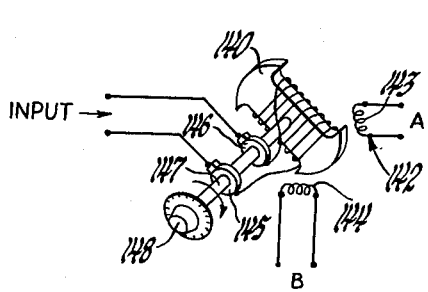
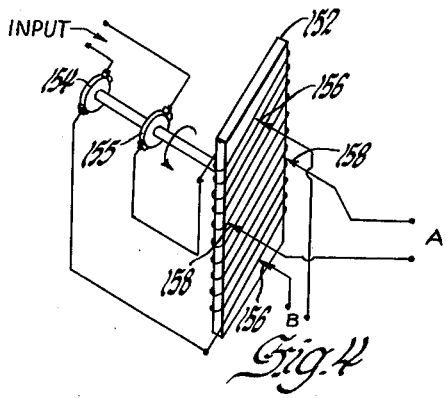
Inventor
William F. King
By E. W. Christen
Attorney

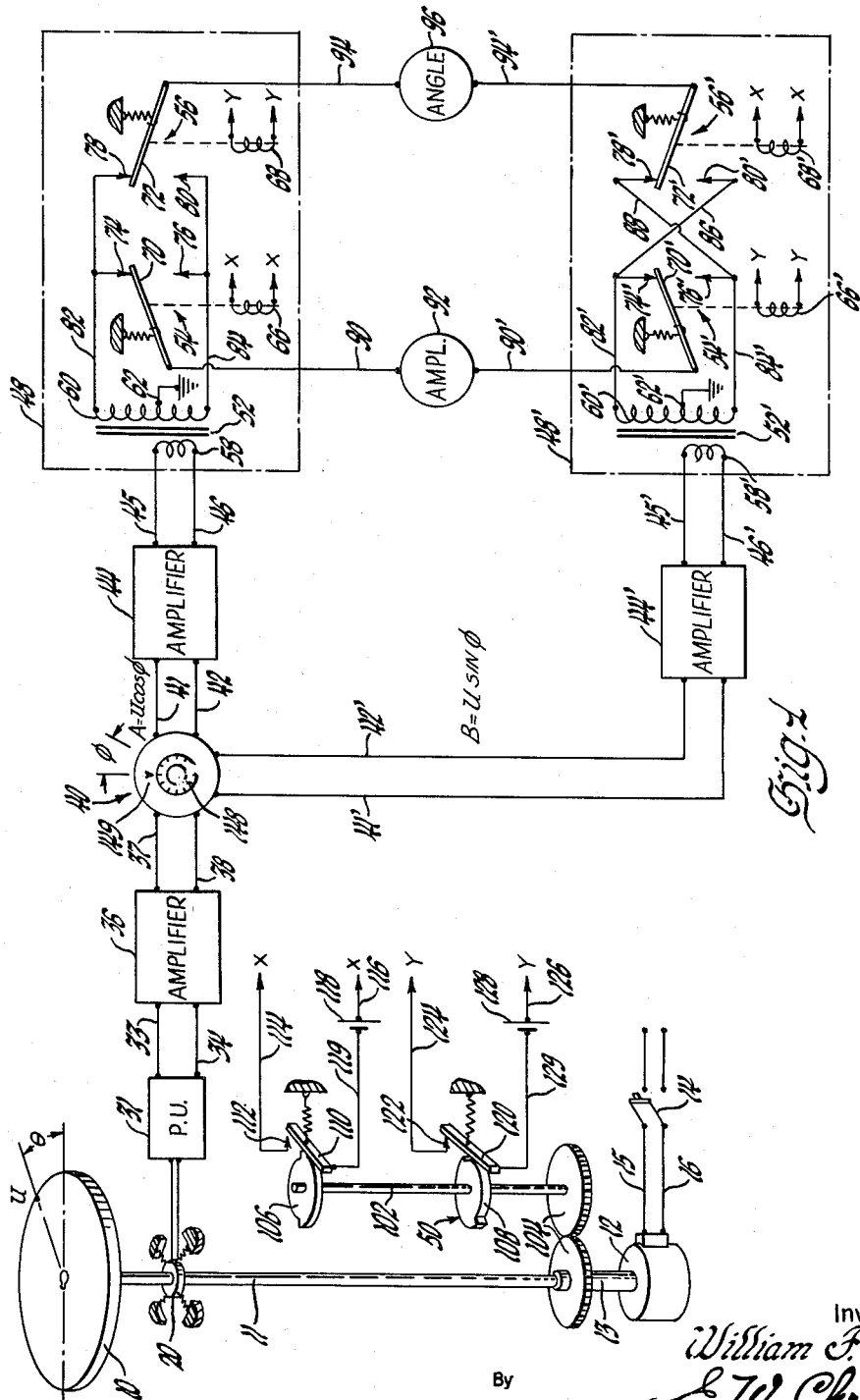

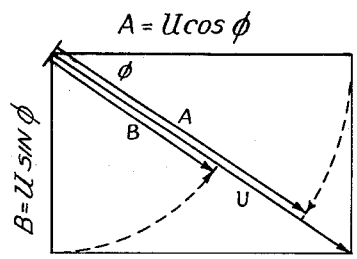
Fig.5
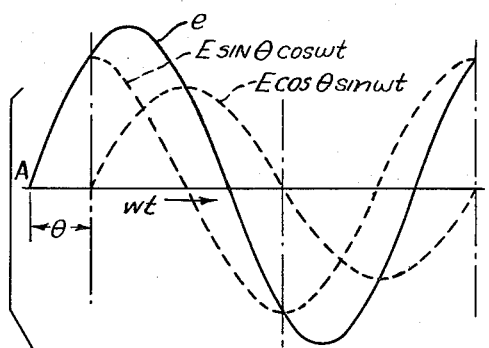
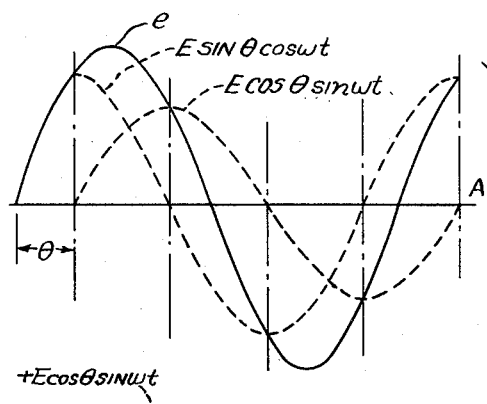
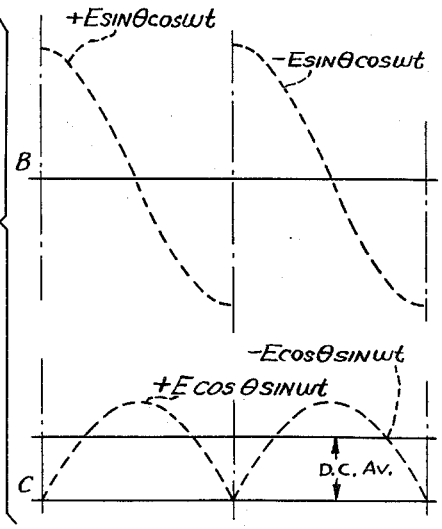
Fig.6
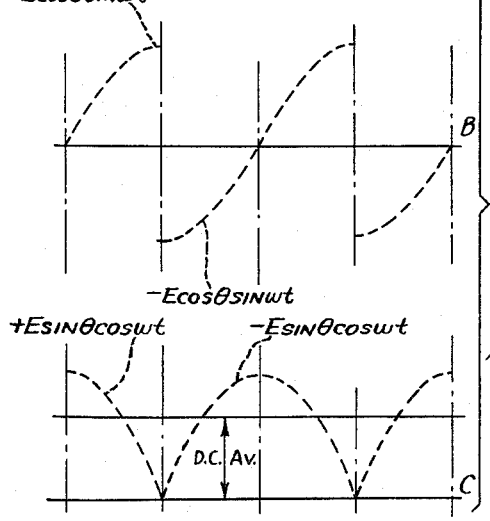
Fig.7

June 20, 1961  W. F. KING  2,988,918
BALANCING MACHINE
Filed July 25, 1955  5 Sheets-Sheet 4

INVENTOR.
William F. King
BY
E. W. Christen
ATTORNEY

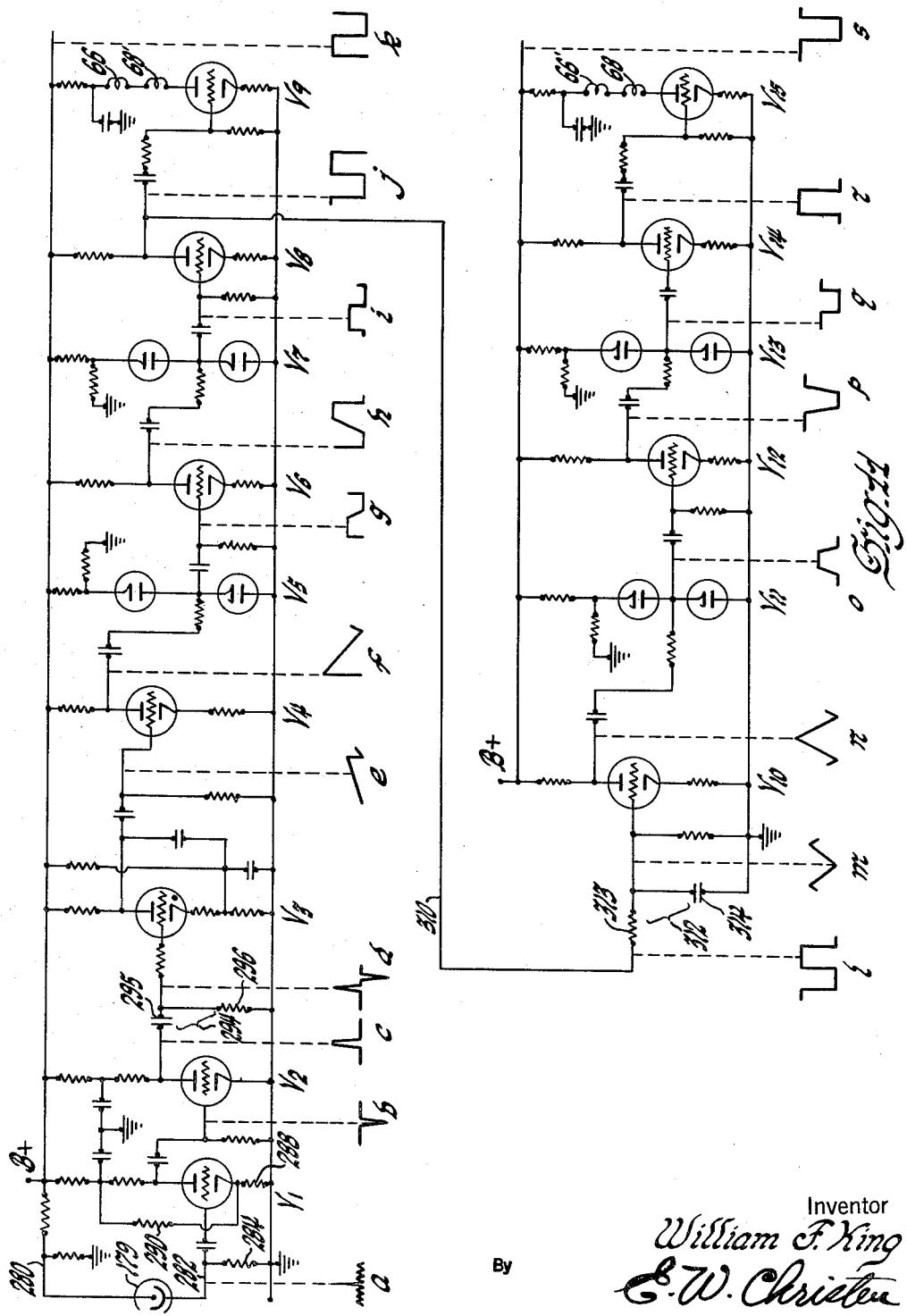

United States Patent Office 2,988,918
Patented June 20, 1961

2,988,918
BALANCING MACHINE
William F. King, Birmingham, Mich., assignor to General Motors Corporation, Detroit, Mich., a corporation of Delaware
Filed July 25, 1955, Ser. No. 524,253
6 Claims. (Cl. 73—462)

This invention relates to apparatus for determining the angular location and the amount of unbalance in a rotating part and, more particularly, to an organization using a reference or timing signal fixed with respect to the machine drive spindle or the rotating part being balanced.

In prior forms of balancing machine in which the amount and location of unbalance is measured and displayed on suitable electrical indicating instruments, a measure of the amount of unbalance may be obtained by sensing the mechanical vibrations induced by an unbalanced workpiece in the cradle or balancing stand supporting the workpiece, converting the vibrations into an electrical signal representative of the vibrations and measuring the amplitude thereof.

The angle or location of the unbalance may be determined by developing a synchronous timing or reference signal and comparing the phase of the unbalance signal against that of the reference signal in suitable phase comparison apparatus such as a watt meter, for example. The reference signal may be derived by driving synchronously with the machine spindle a small alternator or commutator device such as a variable contactor mechanism and voltage source in which the alternator or contactor mechanism is of the type having a movable stator casing to permit changing the phasing or timing of the reference signal with respect to a fixed point on the machine spindle. With the reference signal connected to one coil of the watt meter and the unbalance signal to the other, the reference signal may be varied in phase by moving the stator of the alternator or the commutator mechanism to obtain a null reading in the output of the watt meter or comparison device. The amount of adjustment of the alternator or commutator device will be a measure of the angular location of the unbalance in the rotating part with respect to the fixed point on the machine spindle.

The above-described apparatus for providing a variable phase reference signal for unbalance angle determinations is generally expensive and bulky, sometimes requiring the use of massive movable parts on the machine proper and a considerable amount of mechanism in order to make the apparatus accessible for adjustment from without the machine. Some complications also may be encountered in automatic balancing installations contemplating servo positioning of the alternator or commutator casing when viewed from considerations of the power required in the servo positioning and associated amplifier apparatus. In those installations where a direct drive connection cannot be employed between the part to be balanced and the drive motor as, for example, on belt driven balancing machines, a variable phase reference signal cannot always be conveniently provided and resort must be had to other expedients such, for example, as stroboscopic flasher devices, which illuminate a graduated scale provided on the body to be balanced, for measuring the angular location of unbalance. Such devices are not only affected by changes in speed of the drive motor but are characterized by appreciable time lag and are susceptible of substantial error by reason of the form of display presented thereby.

The present invention has for its general object to provide an apparatus for measuring the amount and the angle or location of unbalance in a rotating workpiece that avoids the aforementioned disadvantages of prior forms of balancing machines. More specifically, the invention seeks to provide a balancing organization which measures the amount and the angle of unbalance in a rotating workpiece with a fixed reference or timing signal and which is specially adapted for use in automatic balancing installations or belt driven balancing machines. The above and other objects, together with the advantages and features of the present invention, will appear more fully from the following detailed description and drawings wherein:

FIG. 1 is a schematic illustration of a balancing organization in accordance with the present invention;

FIG. 2 is a sketch showing a mechanical structure for a part of the apparatus of FIG. 1;

FIGS. 3 and 4 are schematic illustrations of one of the parts employed in the apparatus of FIG. 1;

FIG. 5 is a vector diagram that is useful in understanding the operation of a part of the apparatus of FIG. 1;

FIGS. 6A to 6C and 7A to 7C are timing diagrams useful in understanding the operation of another part of the apparatus of FIG. 1;

FIG. 11 is a schematic, electrical wiring diagram of a part of the apparatus of FIG. 10; and FIGS. 11a to 11s are curves of typical voltage wave shapes obtained at various points in the circuit of FIG. 11.

Figure 8:
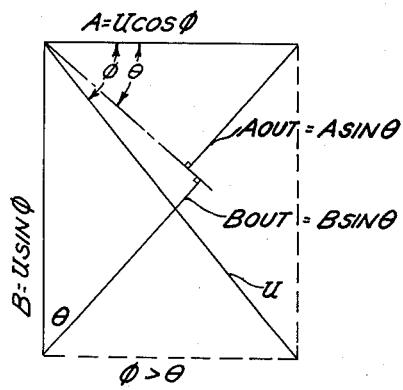
FIGS. 8 and 9 are further vector diagrams useful in understanding the operation of the present invention.

Referring to the drawings, there is shown in FIG. 1 a static balancing machine using the principles of the present invention for determining the angle and the amount of unbalance in a workpiece 10 which may be a flywheel, torus part or cover, fan, etc. Such machines are termed static balancing machines where the parts to be balanced thereby are of short axial extent, as characterized by the above mentioned parts, so that substantially all of the unbalance moment therein may be considered to reside in a single transaxial plane. The part to be balanced is suitably fixed and mounted on a vertically mounted balancing machine spindle 11 which is driven from a constant speed electrical drive motor 12 having a hollow drive shaft 13. The motor 12 is adapted to be connected through a switch 14 to a suitable source of electrical power supplied thereto over conductors 15, 16. The machine spindle 11 extends coaxially through the hollow drive shaft of the motor and is connected at its lowermost end to the adjacent end of the drive shaft 13 through a universal joint or connection 18, as shown in FIG. 2. The uppermost portion of the balancing machine spindle is resiliently supported in a spring mounted bearing, illustrated schematically at 20, which permits oscillation or deflection of the balancing machine spindle under the influence of unbalance in the workpiece.

As shown more fully in FIG. 2, the drive motor 12 is mounted in a vertical position with its base 22 standing on the base portion 23 of an upstanding supporting structure 24. The balancing machine spindle 11 extends through an opening 25 in a flanged or radially inwardly extending upper portion 26 of the supporting structure mounting a number of supports as 27 for adjustable springs 28 connected to the bearing 20.

Suitably mounted in contacting relation with the machine spindle 11 or bearing 20 is a suitable mechanical-electrical transducer 31, such as an electrodynamic pick-up, which develops an alternating current signal whose frequency corresponds to the speed of the drive motor and whose amplitude varies in accordance with the amount of unbalance U as determined by the amount of deflection of the balancing machine spindle in a plane normal to the shaft of the drive motor 12. The output signal from the pickup is applied over electrical conductors 33, 34 to the input terminals of a conventional amplifier 36. The output terminals of the latter are connected over conductors 37, 38 to the input terminals of a harmonic vector resolver 40 having a pair of quadrature related outputs labeled A and B, which are connected respectively over conductors 41, 42 and 41', 42' to the input terminals of a pair of matched amplifiers 44, 44' of the parallel electrical circuits shown. The output terminals of the branch amplifiers 44 and 44' are connected over conductors 45, 46 and 45', 46' to the input terminals of modulating means such as a pair of rectifier or chopper devices 48, 48', which are shown as relay actuated contact devices that are controlled from a contactor or commutator mechanism that is illustrated at 50 and is operated in synchronism with the machine drive spindle 11.

Each of the chopper devices 48 and 48' includes a transformer 52, 52' and a control circuit portion such as a pair of DPDT relays 54, 56 and 54', 56'. Each of the transformers 52 and 52' has a primary winding 58, 58' and a secondary winding 60, 60' with a grounded center tap connection 62, 62'. Relay devices 54, 56 and 54' 56' contained within the choppers 48 and 48' include an activating coil 66, 68 and 66', 68', respectively, for operating spring biased switch arms 70, 72 and 70', 72', all of the relays being shown in their de-eenergized position. Switch arms 70 and 70' of relays 54 and 54' are operated by their coils 66 and 66' between fixed contacts 74, 76 and 74' 76', respectively. Switch arms 72 and 72' are operated by their coils 68 and 68' between contacts 78, 80 and 78', 80', respectively. One end of the transformer secondary winding 60 of chopper 48 is connected over conductor 82 to contact 74 and 78 of relays 54 and 56, and its other end connected over conductor 84 to contacts 76 and 80. Secondary winding 60' of the chopper 48' is connected at one end by conductor 82' to contact 74' of relay 54' while the other end of this transformer secondary winding is connected by conductor 84' to contact 76' of relay 54'.

In order to reverse the phase of the current supplied to the contacts of relay 56' for reasons brought out below, contact 74' of relay 54' may be connected over conductor 86 to the oppositely positioned contact 80' of relay 56', and contact 76' may be connected over conductor 88 to contact 78'. Switch arms 70 and 70' of relays 54 and 54' are connected over conductors 90, 90' to a suitable utilizing device such as an indicator or meter 92 on which is dissplayed or recorded a quantity related to the total amplitude U of unbalance, as will appear more fully below. The meter 92 is a conventional D.C. ammeter such as a General Electric microammeter Model 8DB 18AI BEIB. Switch arms 72 and 72' of relays 56 and 56' are connected over conductors 94 and 94' to another utilizing device 96, which can be a zero center indicating meter on which is displayed a quantity related to the angle or location θ of unbalance in the workpiece.

The commutator or synchronously driven contactor mechanism 50 includes a shaft 102 driven from the motor drive shaft 13 through a set of unity ratio gears shown at 104 and mounts a pair of 180 degree cams 106, 108 spaced mechanically 90 degrees apart. Cam 106 has associated therewith a spring biased contact arm 110 which is adapted to contact stationary contact 112 and to complete an electrical circuit therethrough during one half of each revolution of the shaft through conductor 114, which is adapted to be connected to one terminal of relay coils 66 and 68' the opposite coil terminals of which are connected over conductor 116 through battery 118 and conductor 119 to contact arm 110. Cam 108 has associated therewith spring biased contact arm 120 which is adapted to contact stationary contact 122 and to complete an electrical circuit therethrough during one half of each revolution of the shaft through the conductor 124, which is connected to one terminal of relay coils 66' and 68 the opposite coil terminals of which are connected over conductor 126 through battery 128 and conductor 129 to contact arm 120.

In the interest of clarity, the construction and operation of suitable forms of harmonic vector or sine-cosine resolvers that may be employed in the present invention are treated below.

A sine-cosine resolver is an instrument type electromechanical device into which an electrical signal and a mechanical angle φ can be introduced. Physically, these devices are of small dimensions and light mass and require a very small amount of mechanical torque for actuation thereof. From the resolver are obtained two electrical signals, one proportional to the product of the input signal and the sine of the mechanical angle, the other proportional to the product of the input signal and the cosine of the mechanical angle.

One common device employed for sine-cosine resolution is the synchro resolver shown schematically in FIG. 3. The synchro resolver consists of a salient pole wound rotor 140 and a two phase stator 142 having its two phase windings 143, 144 mechanically oriented at 90 degrees. The rotor is energized through slip rings 145, 146 to which the input signal to be resolved is applied. The shaping of the pole pieces and the distribution of the windings is proportioned to obtain flux linkages between the rotor and the stator windings which vary sinusoidally with the mechanical angular position of the rotor. Fastened to the rotor shaft 147 of the synchro is an angularly graduated adjusting knob 148 that cooperates with an index pointer 149 on the stator casing (FIG. 1) whereby the rotor may be manually turned relative to the stator to introduce any desired mechanical angle into this vector resolver.

Another form of sine-cosine resolver is the sine-cosine potentiometer or D.C. resolver, which is shown in FIG. 4 and consists of a rectangular card 152 wound with a continuous conductor to form a flat coil of straight, parallel, uniformly spaced, current carrying wires. The input signal is applied to the opposite ends of the coil through the slip ring connections 154, 155. Rotation of the card about its midpoint causes the two sets of output contacts 156 and 158 to trace a circular path on the resistance card. The potential between each brush and the midpoint of the winding varies sinusoidally with the angle of card rotation. In the interest of economy of supply voltage two contacts at opposite ends of a diameter are employed rather than one for each component output. Two pairs of contacts, spaced 90 degrees apart, are used to generate a sine and cosine function simultaneously from the same card.

The electrical action of the combination of a sine-cosine resolver and synchronously driven chopper system on the unbalance voltage is discussed below.

In FIG. 5 the action of the resolver is vectorially diagrammed. At a resolver angle of φ, the unbalance U is resolved into two components $A = U \cos \phi$ and $B = U \sin \phi$. A and B are shown revolved parallel to U to emphasize that A and B still have the same electrical phase as the unbalance U.

For amplitude determination, relay coil 66 of the branch A chopper 48 is connected to be alternately and periodically energized and de-energized in circuit $x$—$x$, which is alternately and periodically completed and interrupted by commutator or breaker cam 106 and its associated contacts 110, 112, while relay coil 66' of the branch B chopper 48' is connected to be alternately and periodically energized and de-energized in circuit $y$—$y$, which is alternately and periodically completed and interrupted by commutator or breaker cam 108 and its associated contacts 120, 122 phased 90 degrees in space and time with respect to cam 106.

Considering $\theta$ as the phase angle between the commutator 0° position and the angular location of the unbalance in the workpiece, the A chopper then yields a pulsating, rectified D.C. voltage at A-output, which is taken between chopper arm 70 and center-tap 62, whose average value is proportional to $A \cos \theta$. The B chopper will yield a similar D.C. voltage at B-output, which is taken between chopper arm 70' and center-tap 62', whose average value is proportional to $B \sin \theta$. Thus, the choppers 48, 48', like the static resolver 40, also perform a harmonic resolving function which varies, however, dynamically with changes in the timing or phasing of the input signal.

The sin $\theta$ and cos $\theta$ resolution of the input signals applied to the input terminals of the choppers will be apparent by reference to the timing curves of FIGS. 6 and 7, which show how an alternating voltage $e$, expressed mathematically as $E \sin (wt+\theta)$, may be resolved by proper chopper action into two direct current voltages proportional to $E \sin \theta$ and $E \cos \theta$, where $\theta$ is any fixed reference angle with respect to $wt=0$. Viewed physically in terms of the structure of FIG. 1, the angle $\theta$ corresponds to the angular location of the unbalance relative to a fixed point on the balancing machine spindle 11 or to the zero degree position of the commutator 50 which is mounted so as to have a known or definite angular relationship with respect to said fixed point.

The voltage $e$ is shown in solid line in FIGS. 6A and 7A with its quadrature components $E \cos \theta \sin wt$ and $E \sin \theta \cos wt$ conveniently shown by the dotted curves. If the voltage $e=E \sin (wt+\theta)$ is applied to the input of chopper 48 and is chopped at $wt=0$ degrees by relay 54 operated from the circuit controlled by cam 106, the components of this voltage will be translated or operated upon by the chopper as shown in FIGS. 6B and 6C. These curves show that both $E \cos \theta \sin wt$ and $E \sin \theta \cos wt$ are passed unchanged during the interval of from 0° to 180° and are passed with their phase reversed during the interval of from 180° to 360°. From the timing curve of FIG. 6B it can be seen that a D.C. level of zero is obtained by chopping the $E \sin \theta \cos wt$ component at 0° phasing. From FIG. 6C it can be seen that the D.C. voltage resulting from the 0° chop action on $E \cos \theta \sin wt$ will be equal to the integrated average value of a sine wave over the interval 0° to 180°. This average voltage is 63.7% of the peak voltage. In other words, the A.C. voltage component $E \cos \theta \sin wt$ has yielded a D.C. voltage of 63.7% of $E \cos \theta$. Thus, the only voltage obtained from the 0° chop action will be a D.C. voltage proportional to $E \cos \theta$ plus ripple, which can be removed by a conventional filter.

If the voltage $E \sin (wt+\theta)$ is chopped by the branch B chopper 48' either 90° in advance of or behind the chopping action of the branch A chopper, i.e., $wt=90$ degrees, the resulting output taken from chopper arm 70' and center-tap 62' will be a D.C. voltage whose average value is equal to $0.637 \, E \sin \theta$, as shown in the curves 7A, 7B and 7C of FIG. 7.

Containing now with the explanation of the resolver-chopper action, when the resolver angle $\phi$ is made equal to the unbalance angle $\theta$, the algebraic sum of the D.C. voltages from the branch A and branch B choppers, under the above phasing conditions, will be proportional to the magnitude of the unbalance U. This can be demonstrated analytically and graphically, if desired.

Analytically, the outputs of the resolvers and the choppers may be expressed as:

Resolver—

$$A = U \cos \phi; \quad B = U \sin \phi \qquad (1)$$

Chopper—

$$\text{A-output} = KA \cos \theta; \quad \text{B-output} = KB \sin \theta \qquad (2)$$

Combining the outputs of the choppers, there is obtained $$\text{A-output} + \text{B-output} = KA \cos \theta + KB \sin \theta \qquad (3)$$

Substituting Equations 1 in 3, $$\text{A-output} + \text{B-output} = KU \cos \phi \cos \theta + KU \sin \phi \sin \theta \qquad (4)$$
$$= KU (\cos \phi \cos \theta + \sin \theta \sin \theta) \qquad (5)$$

When $\phi = \theta$, Equation 5 becomes:

$$\text{A-output} + \text{B-output} = KU (\cos^2 \theta + \sin^2 \theta) \qquad (6)$$

Since $(\cos^2 \theta + \sin^2 \theta) = 1$, Equation 6 becomes $$\text{A-output} + \text{B-output} = KU \qquad (7)$$

Equation 7 states that the sum of the D.C. voltage obtained by chopping the A component at 0° phasing and B component at −90° phasing, is proportional to the unbalance in the workpiece when the resolver shaft is set at the same angle as the unbalance in the workpiece.

For phase determination, relay 56 of the branch A chopper is driven by the −90° phased contacts 120, 122 operated by commutator cam 108 and relay 56' of the branch B chopper is driven by the 0° contacts 110, 112 operated by commutator cam 106. The branch A chopper then yields a D.C. voltage at A-output that is proportional to $A \sin \theta$ and the branch B chopper a D.C. voltage at B-output proportional to $B \cos \theta$. When the resolver angle $\phi$ is made equal to the unbalance angle $\theta$, the difference between the D.C. voltages from the A and B choppers, 48 and 48', under these phasing conditions will be zero and will be phase sensitive for deviations between $\phi$ and $\theta$. That is, when $\phi$ is less than $\theta$, A-output minus B-output will be positive, and when $\phi$ is greater than $\theta$, A-output minus B-output will be negative.

The statement that A-output minus B-output is zero when $\phi = \theta$ can be shown analytically as follows:

Resolver—

$$A = U \cos \phi; \quad B = U \sin \phi \qquad (1)$$

Chopper—

$$\text{A-output} = KA \sin \theta; \quad \text{B-output} = KB \cos \theta \qquad (2)$$

Combining the outputs of the choppers differentially, $$\text{A-output} - \text{B-output} = KA \sin \theta - KB \cos \theta; \qquad (8)$$

and substituting Equations 1 in 8, $$\text{A-output} - \text{B-output} = KU \cos \phi \sin \theta - KU \sin \phi \cos \theta. \qquad (9)$$

When $\phi = \theta$, Equation 9 becomes $$\text{A-output} - \text{B-output} = KU \cos \theta \sin \theta - KU \sin \theta \cos \theta = 0 \qquad (10)$$

Figure 9:
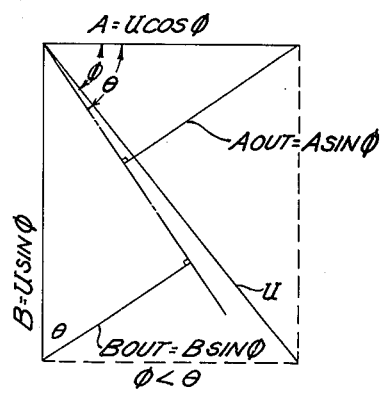
Figure 10:
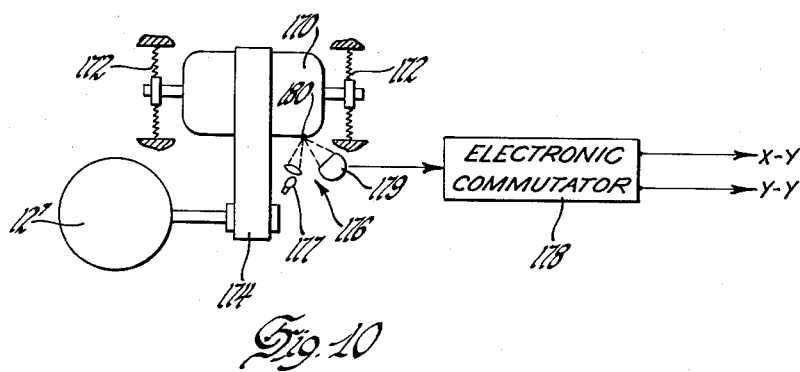
FIG. 10 illustrates the application of the balancing apparatus of the present invention to a belt driven form of balancer.

The statement that A-output minus B-output is not zero and is phase sensitive when the resolver angle $\phi$ either exceeds or is less than the unbalance angle $\theta$ can be more easily shown graphically. FIG. 8 is a graphical vector solution for A-output minus B-output when $\phi$ is greater than $\theta$, from which it can be seen that A-output minus B-output will be negative. FIG. 9 is a graphical vector solution for A-output and B-output when $\phi$ is less than $\theta$ from which it can be seen that A-output minus B-output will be positive. Since the sign of the DC output changes as $\phi$ passes through $\phi = \theta$, the output is considered phase sensitive.

From the foregoing description, it is believed that the operation of the resolver-chopper system as applied to the manually operated balancing machine of FIG. 1 is sufficiently clear.

In operation the drive motor 12 is energized and started and the angle knob 148 on the resolver 40 adjusted to obtain a zero reading on the null meter 96. The unbalance amplitude is then read from the unbalance meter 92 and the angular location of the unbalance read from the angle adjust knob 148.

It will be noted that, in distinction to prior forms of balancing organizations, no mechanical adjustment of the angular position of the breaker contacts relative to the cams 106 and 108 of the mechanical commutator mechanism 50 is made in the determination of the angle of unbalance and that the only adjustment made herein is of the electrical quadrature resolver 40 whose construction is such as to permit ready adjustment thereof from without the machine without requiring the use of massive parts, considerable mechanism, or substantial power.

If the above-described system were to be used on a belt driven machine as shown in FIG. 11 in which the workpiece 170 is shown supported in resiliently mounted bearings 172 and is driven from the drive motor 12' through belt 174, the mechanical commutator or breaker system 50 of FIG. 1 can be replaced by a photocell synchronizing pickup unit 176 and an electronic commutator 178. The synchronizing pickup unit 176 may be of the photo-electric or magnetic variety, the former including a light source 177, which illuminates a paint spot 180 on the workpiece, and a standard photocell 179 (FIG. 11) that produces a synchronizing output signal pulse from the illumination reflected from the paint spot. The electronic commutator 178 provides a pair of 90 degree, time-displaced square wave outputs for application to the relay coils of the choppers 48 and 48' and is shown more fully in FIG. 11 described below.

The electronic commutator is shown schematically in FIG. 11 together with the wave shape indicated by the curves $a$ through $s$ of the voltages obtained at various points therein and comprises a number of electronic vacuum tube circuits including a biased linear amplifier V1, amplifier V2, saw-tooth generator V3, linear amplifier V4, double clipper V5, amplifier V6, second double clipper stage V7, linear amplifier V8 and power amplifier V9. A branch connection between stages V8 and V9 leads to a linear amplifier V10 which is followed by a double clipper V11, linear amplifier V12, second double clipper V13, linear amplifier V14 and power amplifier V15, the stages V11 through V15 being the same as stages V5 through V9.

The photocell 179 is shown connected between conductors 280 and 282 and develops a voltage shown at 11$a$ across resistor 284 connected to ground in the input circuit of V1. V1 is cathode biased through resistors 288 and 290 to conduct at input voltages in excess of say 0.5 volt, thereby removing substantially all of the noise content of the raw synchronizing input pulse supplied thereto and provides an amplified inverted pulse such as is shown at 11$b$ to the input of amplifier V2. V2 is unbiased and provides an inverted amplified pulse of substantially constant height in its output shown at 11$c$ to a differentiating network 294 constituted by condenser 295 and resistor 296 across which is developed a voltage shown at 11$d$ that is applied to the input of the saw-tooth generator stage V3 which produces a saw-tooth wave of the same frequency or repetition rate as the synchronizing input signal.

V3 is a conventional saw-tooth generator circuit similar to that used in sweep circuits for cathode ray oscilloscopes and provides an output shown at 11$e$ to the input of the succeeding linear amplifier stage V4. The amplified inverted output of V4 shown at 11$f$ is applied to a conventional double-diode limiter stage V5 biased to +1 volt and providing symmetrical positive and negative clipping action. V4 furnishes a voltage such as that shown at 11$g$ to the linear amplifier V6, whose output shown at 11$h$ is supplied to a second symmetrical double-diode limiter section V7 for further wave shaping purposes. The output of V7 is a square wave shown at 11$i$ which is supplied to the power amplifier section V9 through the preceding linear voltage amplifier V8. Connected in the output circuit of the power amplifier are the relay coils 66 and 68' of the choppers 48 and 48' of FIG. 1 which are periodically energized and de-energized in accordance with the potential of the square wave output of the power amplifier shown at 11$k$.

In order to derive a second square wave displaced 90 degrees in time from the wave of 11$k$ for driving the relay coils 66' and 68 of the choppers 48 and 48', the square wave output of V8 is supplied over branch conductor 310 to an integrating network 312 constituted by resistor 313 and condenser 314 which network operates upon the square wave of 11$l$ supplied thereto produce a displaced triangular wave such as 11$m$ across condenser 314 that is supplied to the input of the linear amplifier V10. From the linear amplifier V10 the amplified output wave 11$n$ is operated upon successively by the cascaded stages V11, V12, V13, V14 and V15, producing the voltage shapes of FIGS. 11$o$, $p$, $q$, $r$ and $s$, respectively, with the resulting square wave of 11$s$ being displaced 90 degrees in time from wave 11$k$ of the upper channel or branch circuit. The output of the power amplifier stage V15 has connected therein the operating coils 66' and 68 of the chopper relays of FIG. 1.

It is important to note that the vector resolver 40, in distinction to a phase shifter, does not affect the phase or timing characteristics of its resolved components $U \cos \phi$ and $U \sin \phi$, which have the same phase $\theta$ with respect to a fixed point on the workpiece as that of the unbalance signal $U$, as evident from FIG. 5. The present invention thus avoids the disadvantage of prior forms of unbalance measuring apparatus, which employ phase sensitive components requiring operation of the balancer at one particular speed, and may be operated at any constant speed over a wide range of operating speeds of the balancing machine drive motor.

It is to be understood that the above-described arrangements are illustrative of the application of the principles of the invention. Numerous other arrangements may be devised by those skilled in the art without departing from the spirit and scope of the invention.

What is claimed is:

1. Apparatus for determining the angular location of unbalance with respect to a fixed point on a workpiece comprising in combination, drive means rotating said workpiece; means sensing and converting the vibrations induced by unbalance in said workpiece into an electrical signal representative thereof; adjustable harmonic resolving means having a pair of input terminals connected to said vibration sensing means and two pairs of output terminals; said resolving means being effective to resolve said electrical signal into a pair of quadrature related signals, a pair of modulating means each having a first set of input terminals, a second set of input terminals and a pair of output terminals; means connecting the said first set of input terminals of each of said modulating means to a different one of said pairs of output terminals of said harmonic resolving means; means synchronized with said driving means deriving a pair of synchronous timing signals spaced 90 degrees in time apart and having a fixed relation in space and time with respect to said point on said workpiece, means supplying said pair of timing signals to said second set of input terminals of said pair of modulating means; said modulating means being actuated in response to said timing signals for modulating said quadrature related signals in response thereto, indicating means differentially combining the outputs of said pair of modulating means; and means for adjusting said resolving means until said differentially combined outputs are in a predetermined relation.

2. The combination in accordance with claim 1 above wherein said synchronized timing means comprises a mechanical commutator mechanism.

3. The combination in accordance with claim 1 above wherein said synchronized timing means comprises an electronic commutator.

4. The combination in accordance with claim 1 above wherein each of said modulating means is a relay actuated chopper device.

5. The combination in accordance with claim 4 above wherein each of said relay actuated chopper devices includes a transformer having a center-tapped secondary winding and a primary winding forming one of said sets of input terminals connected to one of said pairs of output terminals of said resolving means, a pair of relays each having a switch arm operable between two contact positions connected to opposite sides of said transformer secondary winding, and an operating coil for each relay, said operating coils being connected to the other of said sets of input terminals for periodic energization and de-energization by a different one of said timing signals of said synchronous timing means.

6. Apparatus for determining the magnitude U of unbalance in a workpiece and its angular location $\theta$ with respect to a fixed point thereon comprising the combination of drive means rotating the workpiece; means sensing and converting the vibrations induced by unbalance in said workpiece into an electrical signal having amplitude and phase characteristics representative thereof; adjustable harmonic resolving means connected to receive said unbalance signal and providing a pair of harmonically resolved component signals A and B therefrom having the same phase characteristics with respect to said fixed point as said unbalance signal; means providing a pair of synchronous timing signals spaced 90 degrees in time apart and having a fixed relation with respect to said point; a pair of modulating means each having an input circuit portion connected to receive a different one of said harmonically resolved component signals, a pair of control circuit portions each connected to receive a different one of said timing signals, and a pair of output circuit portions providing a pair of output signals, the modulating means that is connected to receive the resolved component signal A having output signals which include $A \cos \theta$ and $A \sin \theta$ and the modulating means that is connected to receive the resolved component signal B having output signals which include $B \cos \theta$ and $B \sin \theta$; a magnitude indicator connected to one of the outputs of each modulating means; and angle indicator connected to the other of the outputs of each modulating means; means for adjusting said resolving means so that the magnitude indicator will indicate the sum of $A \cos \theta$ and $B \sin \theta$ and the angle indicator will indicate the null difference of $A \sin \theta$ and $B \cos \theta$.

References Cited in the file of this patent

UNITED STATES PATENTS

| | | |
|---|---|---|
| 2,196,039 | Thearle | Apr. 2, 1940 |
| 2,405,430 | Kent | Aug. 6, 1946 |
| 2,451,863 | Oakley | Oct. 19, 1948 |
| 2,731,834 | Fehr | Jan. 24, 1956 |
| 2,731,835 | Hellar | Jan. 24, 1956 |
| 2,783,649 | Hope | Mar. 5, 1957 |
| 2,787,907 | King | Apr. 9, 1957 |
| 2,828,911 | Lash | Apr. 1, 1958 |